United States Patent [19]

Alford

[11] 4,351,209

[45] Sep. 28, 1982

[54] REMOTE CONTROL BENCH MOUNTED CHAIN SAW APPARATUS

[76] Inventor: Steven D. Alford, 426 Birch Rd., Coon Lake Blvd., Wyoming, Minn. 55092

[21] Appl. No.: 160,146

[22] Filed: Jun. 17, 1980

[51] Int. Cl.³ .......................... B27B 17/02; B25H 1/04
[52] U.S. Cl. ........................................ 83/788; 83/796; 83/574; 83/701; 83/859; 211/189; 108/109; 108/155; 248/150; 144/286 R
[58] Field of Search .................. 83/574, 798, 796, 794, 83/799, 701, 490, 788, 401, 859; 144/285, 286; 211/189, 200; 248/150; 108/119, 155

[56] References Cited

U.S. PATENT DOCUMENTS

| | | | |
|---|---|---|---|
| 2,347,821 | 5/1944 | Goldner | 155/196 |
| 2,435,132 | 1/1948 | D'Horaene | 211/128 |
| 2,851,067 | 9/1958 | Greenslate | 83/796 |
| 3,069,216 | 12/1962 | Vaeth | 312/195 |
| 3,812,977 | 5/1974 | Glassman | 211/177 |
| 4,153,311 | 5/1979 | Tekahashi | 312/107 |
| 4,214,498 | 7/1980 | Zukas et al. | 83/796 |

FOREIGN PATENT DOCUMENTS 1111118 7/1961 Fed. Rep. of Germany ....... 144/286

*Primary Examiner*—Donald R. Schran
*Attorney, Agent, or Firm*—Kinney, Lange, Braddock, Westman and Fairbairn

[57] ABSTRACT

A remote control bench mounted chain saw apparatus for cutting firewood, includes a chain saw device having handle, trigger, body and bar chain. Also included is a bench having a first support member with an interdigital slot, a second support member having a cooperating interdigital slot for mating with the first support member to form a cross, and a top member hingedly mounted on one of the support members on a side parallel to its slot, the top member being further adapted to detachably engage the other support member on a side parallel to its slot when the cross is formed to position the top member in a horizontal position. The top member includes means for restraining the handle and body of the chain saw and positioning the saw to permit access to the top of said bar and chain. Finally, remote control means are attached to the trigger of the saw and have an activator positioned remote from the saw and the top member for activation of the saw triggered by pressure applied to the activator. A preferred pedal-type activator is disclosed which can be operated either by pressure from the operator's knee or from the operator's foot, depending upon the position of the activator.

18 Claims, 10 Drawing Figures

U.S. Patent    Sep. 28, 1982    Sheet 1 of 3    4,351,209
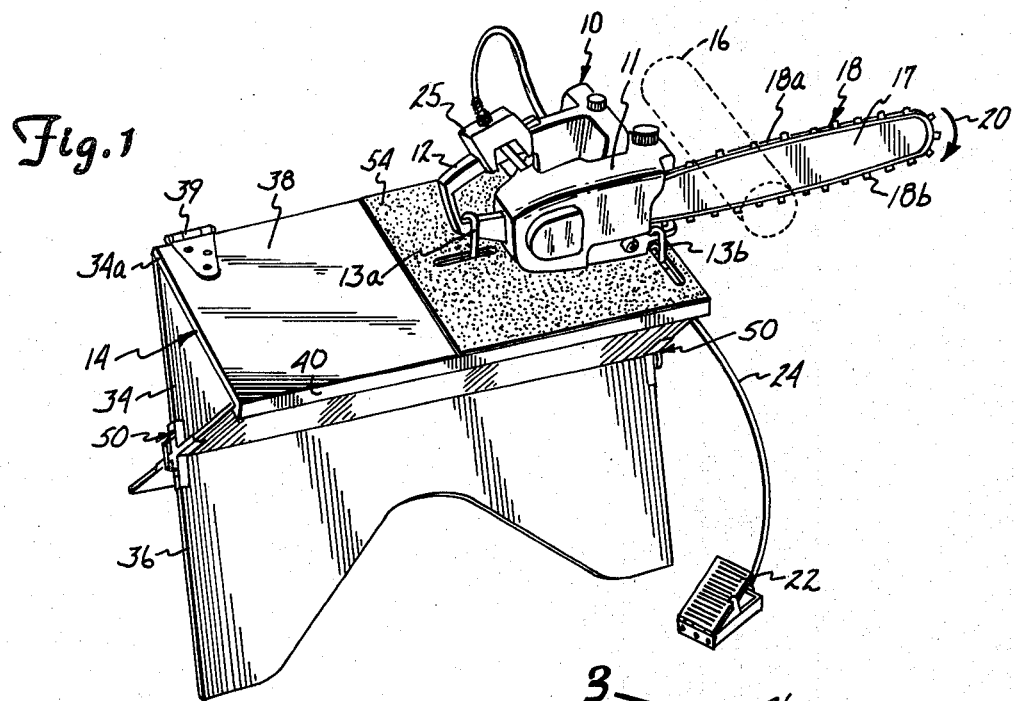
Fig.1
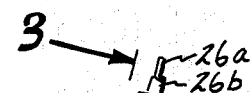
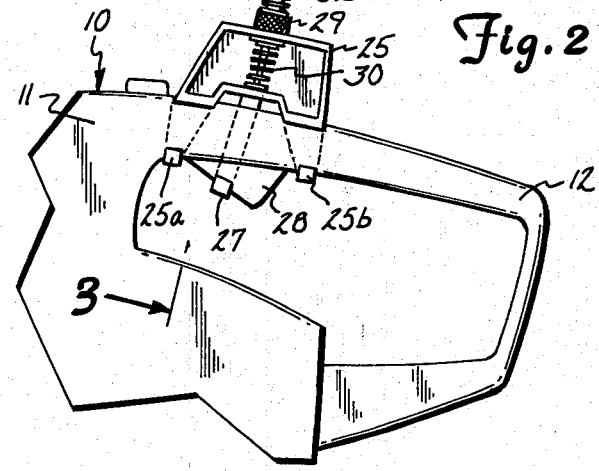
Fig.2
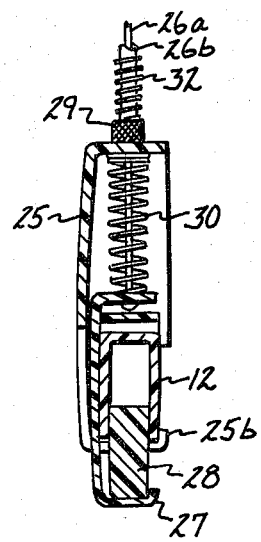
Fig.3
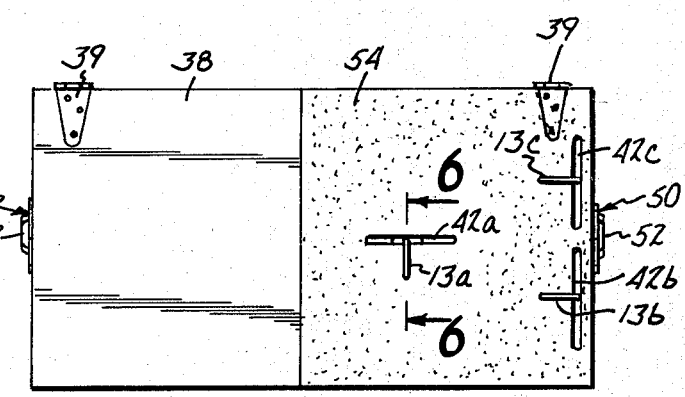
Fig.5

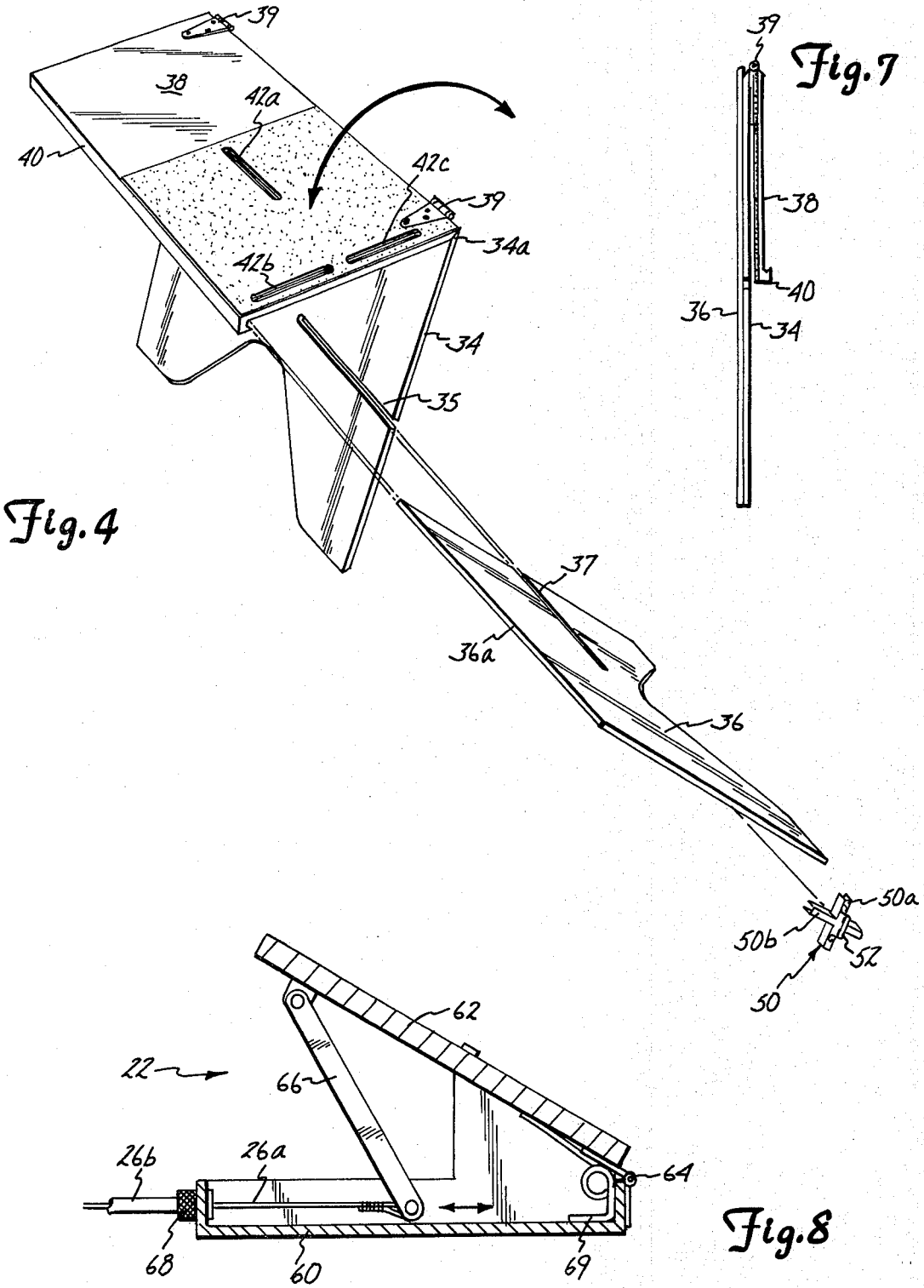

REMOTE CONTROL BENCH MOUNTED CHAIN SAW APPARATUS

BACKGROUND OF THE INVENTION

1. Field of the Invention.

Firewood has become increasingly popular as a heating source as oil prices rise and oil supplies are depleted. This renewable resource is conveniently harvested by individuals for their own use, with their own industry being the major limitation.

Nevertheless, cutting firewood from logs requires an investment in time, energy and equipment which should be kept to a minimum if the largest number of people are to participate. It is desirable to use the least amount of equipment to reduce the initial investment, yet time and labor saving is paramount. Thus a multiple use for any essential equipment while saving time and effort will increase the opportunities for participation in the use of firewood as a heating source.

For the average individual, a chain saw is a major investment, yet one which is absolutely necessary if large quantities of firewood logs are to be produced. After some degree of practice, skill can be acquired by the chain saw owner in cutting down trees. While this dramatic event of felling a tree is essential to gathering firewood, it is only the beginning step since the felled tree must then be reduced to usable lengths of firewood. A chain saw is necessary so as to permit portable cutting.

In larger operations, such as commercial firewood cutting, it is possible to then use the chain saw to cut the tree into lengths suitable for hauling to a centralized location for cutting the logs into firewood. At that location, a permanent and perhaps more powerful saw can be used as may be desired.

Repetitive cutting of logs into firewood in the forest by the individual oftentimes presents problems which are not experienced by large-scale operations. Operation of the chain saw on trees which are on the ground oftentimes require the operator to choose between continually propping the logs to be cut above ground or allowing the saw blade or chain to simultaneously cut through the ground as it cuts the bottom of the logs. A second saw set up for this second cutting operation adds unnecessary expense to the individual operator.

2. Description of Prior Art.

U.S. Pat. No. 2,574,269 discloses a cutting machine using a table with a plurality of vertically disposed legs, horizontal floor plates, shells, chutes and receptacles for cutting even and precise cuts of cloth such as collars, cuffs and the like. The device includes a knee actuated lever for moving the knife or cutting means. Cables which include a core member which moves with respect to the outer cover are common, exemplified by U.S. Pat. No. 3,002,398. U.S. Pat. No. 3,086,574 discloses foot pedals for remote actuation of a device so as to free the operator's hands.

U.S. Pat. No. 3,731,380 discloses a chain saw extension pole which has a means accommodating the handle and a device which interacts with the saw trigger to permit remote activation using a part integral with the handle. As set forth in this patent, the best method to engage and support the chain saw is the handle, which was designed for that purpose. The method of handling the excessive weight on the end of the pole is not disclosed, but the cutting operation is conventional and can only be accomplished by one individual in a safe manner. Similarly, U.S. Pat. No. 3,949,817 discloses another device for extending the reach of a chain saw, for use by one person at a time, using a pole and a saw trigger control which is remote from the actual trigger.

U.S. Pat. No. 3,060,979 discloses a machine bench with four legs bolted to a carring box for holding a portable manually operated electric power tool such as a "circle saw". U.S. Pat. No. 4,068,550 also discloses a folding bench for a normally hand-held circular saw or circle saw using fold leg members on the table. Both of these last two described devices are unsuited for use with a chain saw in the field remote from an adequate workroom. One of the prime drawbacks of these designs is the lack of portability of the bench and the saw.

Various forms of collapsible furniture are shown in U.S. Pat. Nos. 2,347,821, 2,435,132, 3,069,216, 3,812,977, 4,023,681 and 4,153,311.

SUMMARY OF THE INVENTION

It has now been discovered that a device for cutting firewood may be provided which is able to take advantage of a chain saw without requiring elaborate additional equipment or a second saw. The device includes a chain saw having a handle, trigger, body and bar and chain. The device further includes a bench for supporting the chain saw, including a top member wherein said top member includes means for restraining both the handle and the body of the saw. The top member positions the chain saw to permit access to the top of the bar and chain. Finally, remote control means are operably connected to the chain saw and have an activator positioned remote from the chain saw and the top member for activation of the chain saw by pressure applied to the activator.

In a preferred embodiment, the remote control means includes a first cable attached to the trigger, biasing means maintaining the trigger in a normal idle position, sheath means enclosing the first cable and fixedly positioned with respect to the trigger to permit relative movement of the first cable with respect to the trigger, and pedal means attached to said cable for movement of the cable to activate the trigger. The pedal means can be either activated by the operator's foot or activated by the operator's knee, depending upon position of the pedal means.

In a preferred embodiment, the bench means includes a first support member having an interdigital slot, and a second support member having a cooperating interdigital slot for mating with said first support member to form a cross. The top member is hingedly mounted on an upper edge of the support member which is parallel to the slot, and is adapted to detachably engage the other support member on an upper edge parallel to its slot when the cross is formed thereby positioning the top member in a horizontal position. In another preferred embodiment, lock means is provided for temporarily locking the top member to the support members.

BRIEF DESCRIPTION OF THE DRAWINGS

FIG. 1 is a perspective view illustrating the apparatus of the present invention in combination with a chain saw.

FIG. 2 is an enlarged partial view of the handle and trigger of a chain saw with the remote control assembly of the device.

FIG. 3 is a sectional view along line 3—3 of FIG. 2.

FIG. 4 is a perspective exploded view of the preferred embodiment of a table used in the present invention.

FIG. 5 is a top view of the table.

FIG. 7 is an end view of the table of FIG. 4 in collapsed form.

FIG. 8 is a side view of a foot operated control pedal for use with the present invention.

DETAILED DESCRIPTION OF THE PREFERRED EMBODIMENTS

Figure 6:
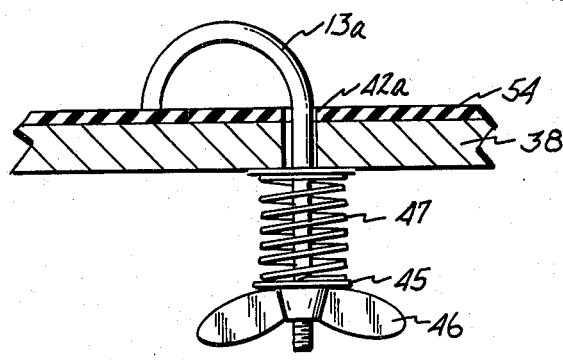
FIG. 6 is a sectional view along line 6—6 of FIG. 5.

As shown in FIG. 1, a chain saw 10 having a body 11 and a handle 12 is mounted by clamps 13a and 13b (and clamp 13c shown in FIG. 4) on table 14. Log 16 is positioned by one or two operators to be cut on the top side of bar 17 and chain 18. The maximum cutting power of chain 18 is achieved on the top edge 18a rather than the bottom edge 18b in conventional chain saws which have a rotation of the chain 18 in the direction of arrow 20. A remote control pedal 22 is connected by cable 24 to bracket 25 for engagement with the trigger of chain saw 10.

In the preferred embodimet shown herein in FIGS. 2 and 3, cable 24 is attached to bracket 25 which in turn is attached to handle 12 of chain saw 10. Bracket 25 preferably includes a pair of downward extending clamping spring arms 25a and 25b which snap around handle 12 to hold bracket 25 securely in place.

Cable 24 includes inner cable 26a and outer cable or sheath 26b. Inner cable 26a is attached to hood shaped actuator 27 which engages trigger 28 of chain saw 10. Nut 29 fixedly secures outer cable 26b to bracket 25 to permit motion of inner cable 26a with respect to outer cable 26b. Spring 30 is provided to maintain trigger 28 in an idling position in the absence of tension from inner cable 26. Outer spring 32 is provided to protect cable 24 by maintaining cable 24 in a position away from the working portion of chain saw 10. Depression of the remote control pedal 22 causes movement of inner cable 26a away from trigger 28, thereby causing actuator 27 to compress spring 30 and increase the speed of the engine of chain saw 10 by pressure on trigger 28. As has been indicated above, the normal condition for trigger 28 is in the idle position, such that removal of the pressure from remote control pedal 22 permits inner cable 26a to return to its normal position by the force exerted by spring 30, thereby terminating the rotation of chain 18.

Thus it can be seen that chain saw 10 is operated in a highly efficient manner whereby the maximum power is delivered to the logs being cut. Operators stand on either side of chain saw 10, so as to permit two operators to handle logs which are to be cut into firewood size. One of the operators operates remote control pedal 22, either by his foot or, if desired, the remote control pedal 22 can be attached to table 14 for activation by the operator's knee. In any event, the operator's hands are free for handling the logs.

In the preferred embodiment table 14 is a collapsible bench formed by support panel members 34 and 36, and top member 38. As shown in FIG. 4, first support member 34 has an interdigital slot 35, and a second support member 36 has a cooperating interdigital slot 37 for mating with the first support member 34 to form a cross when table 14 is assembled (as in FIG. 1).

Top member 38 is hingedly mounted with hinges 39 to an upper edge 34a of first support member 34 which is parallel to its slot 35. Top member 38 is further adapted to attachably engage second support member 36 through flange or lip 40 on upper edge 36a parallel to its slot 37 when the cross is formed to position said top member 38 in a horizontal position with respect to the ground. Slots 42a, 42b and 42c are provided in top member 38 for mounting chain saw body 10 and handle 11. As shown in FIGS. 5 and 6, clamps 13a, 13b and 13c are adapted to fit into slots 42a, 42b and 42c and have a washer 45, wing nut 46 and spring 47 which are positioned on the underside of top member 38. The lower portions of clamps 13a, 13b and 13c are threaded to permit tightening of the clamps. The upper portions of clamps 13a, 13b and 13c are hooks which engage chain saw 10 upon the tightening of wing nut 46. In particular, clamp 13a engages handle 12 while clamps 13b and 13c engage flange 48. Slots 42a, 42b and 42c permit adjustment of clamps to accomodate chain saws of various shapes, sizes and configurations. Although in the preferred embodiment shown in the Figures hook-like clamps are used, the present invention has also used other clamping means, including elastic straps, to clamp chain saw 10 to top member 38.

Cross-shaped retainers or braces 50 are preferably provided for additional stability. Each retainer 50 comprises a pair of channels 50a and 50b which form a cross pattern. Retainers 50 are slipped onto the ends of table 14 at the cross intersection of member 34 and 36. Each retainer 50 preferably includes a handle 52 which permits rapid insertion and removal of retainer 50.

FIG. 7 shows the table 14 in collapsed form. As illustrated in FIG. 6, the preferred table 14 is extremely compact and easy to transport when collapsed, yet provides a sturdy, easy to assemble unit.

In a preferred embodiment, at least a portion of top member 38 is provided with a resilient pad 54 which underlies chain saw 10. Resilient pad 54, which in one embodiment is a rubber pad, reduces vibrations being transmitted from chain saw 10 to table 14.

FIG. 8 illustrates a typical remote control foot pedal 22 of the type which is usable in the present invention. Pedal 22 includes base 60, movable pedal 62, hinge 64, link member 66, nut 68 and torsion spring 69. As shown in FIG. 7, movable pedal 62 is pivotally mounted at its lower end to base 60 by hinge 64. Link member 66 is pivotally connected to movable pedal 62 near their respective upper ends. Outer cable 26b is attached to base 60 by nut 68, and movable inner cable 26a is connected to the lower end of link member 66. As movable pedal 62 is depressed, the lower end of link member 66 moves rearwardly, thereby pulling movable inner cable 26a rearwardly. At the other end of cable 24, this causes inner cable 26a to move actuator 27 to depress trigger 28 of chain saw 10.

Figure 9:
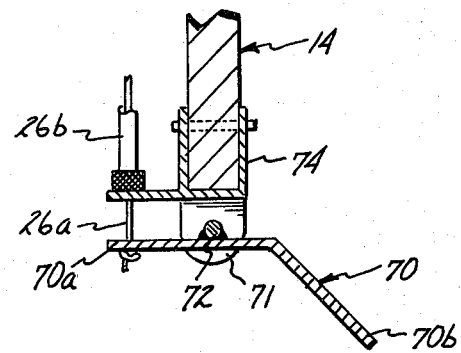
FIG. 9 shows a knee-operated remote control pedal with use with the present invention.

FIG. 9 shows a remote control pedal 22a mounted to table 14 in a position to permit knee actuation by the operator. Remote control pedal 22a includes arm 70, bracket 71, pin 72 and cable clamp 74. Arm 70 is pivotally mounted to table 14 by bracket 71 and pin 72, and has a first end 70a which inner cable 26a is connected, and a second end 70b which is actuated by the operator's knee or the like. Outer cable 26b is held in a fixed position by cable clamp 74.

Figure 10:
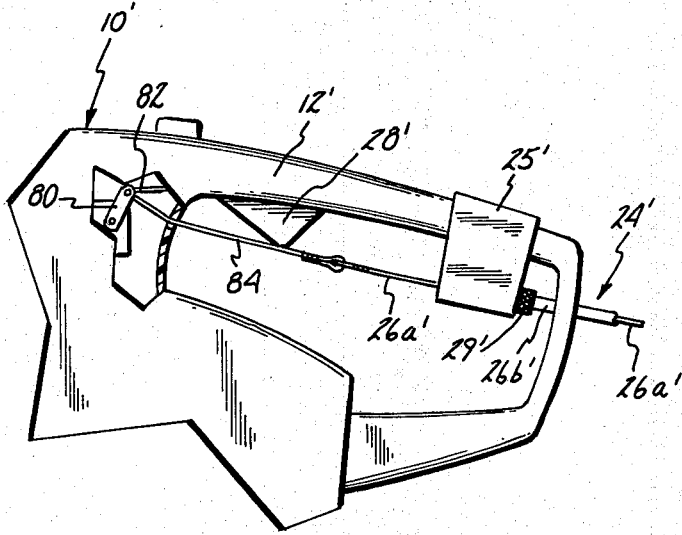
FIG. 10 is a detail view, partially broken away, illustrating an alternative connection of the remote control to the chain saw.

In other embodiments of the present invention, such as the embodiment illustrated in FIG. 10, remote control of the chain saw is achieved without engaging the trigger. In these embodiments, a special alternative linkage is provided from the carburetor throttle linkage which is in addition to the conventional trigger of the chain saw. The remote control operates this alternative linkage, rather than the trigger. In FIG. 10, chain saw 10' had a handle 12', a trigger 28', a throttle linkage 80, a link 82 which connects linkage 80 to trigger 28', and remote actuator linkage 84. Linkage 84 is connected to inner wire 26a of remote control cable 24. Mounting bracket 25' is mounted to handle 12' at a position rearward of trigger 12'. Outer cable 26b' is secured to mounting bracket 25' by nut 29'.

As can be seen from the foregoing description, a new and improved method for cutting firewood has been provided which permits the safe operation of a chain saw by two operators for cutting logs into firewood length, while permitting the operator of the chain saw to derive maximum power from the chain saw by cutting along the top edge 18a of the chain. The weight of log 16 tends to enforce the stability of chain saw 10 on table 14.

Although the present invention has been described with reference to preferred embodiments, workers skilled in the art will recognize that changes may be made in form and detail without departing from the spirit and scope of the invention.

What is claimed is:

1. Apparatus for cutting firewood in cooperation with a chain saw having a handle, trigger, body and bar and chain, the apparatus comprising:
   a bench including:
      a first support panel member having an interdigital slot;
      a second support panel member having a cooperating interdigital slot for mating with said first support panel member to form a cross; and
      a top member for supporting the chain saw in a position which permits cutting access to a top of the bar and chain, the top member being hingedly mounted on the first support panel member proximate an upper edge parallel to its slot in the first support panel member, the top member being provided with means to detachably engage the second support panel member proximate an upper edge parallel to its slot when the cross is formed to position the top member in a horizontal position;
   means for holding the chain saw on the top members; and
   remote control means operably connected to the chain saw and having an activator positioned remote from the chain saw and the top member for control of the operation of the chain saw.

2. The apparatus of claim 1, wherein the means for holding includes clamp means on the top member for restraining the handle and body.

3. The apparatus of claim 1 wherein the remote control means includes a movable cable attached to the trigger, biasing means maintaining said trigger in a normal idle position, sheath means enclosing the movable cable and fixedly positioned with respect to the trigger to permit relative movement of the movable cable with respect to the trigger, and wherein the activator includes pedal means attached to the movable cable for movement thereof to activate the trigger.

4. The apparatus of claim 3 wherein the pedal means is a foot pedal adapted to be foot activated by an operator.

5. The apparatus of claim 3 wherein the pedal means is a knee actuated pedal mounted on the bench and adapted to be activated by an operator's knee.

6. The apparatus of claim 1 which further includes lock means for temporarily locking the top member to the second support panel member.

7. A collapsible bench device comprising:
   a first support panel member having an interdigital slot;
   a second support panel member having a cooperating interdigital slot for mating with said first support panel member to form a cross; and
   a top member hingedly mounted on the first support panel member proximate an upper edge parallel to its slot, the top member being provided with means to detachably engage the second support panel member proximate an upper edge parallel to its slot when the cross is formed to position the top member in a horizontal position, said top member includes means for retaining a chain saw to prosition a chain on the top member to permit access to the top of the chain saw bar.

8. The device of claim 7 wherein the means for retaining a chain saw includes means for engaging the handle and body of said chain saw.

9. The device of claim 8 wherein said top member includes clamp means on said top member for restraining the handle and body of the chain saw.

10. The device of claim 7 and further comprising a cross-shaped channel retainer for engaging the first and second support panel members proximate the cross formed by the first and second support panel members.

11. The device of claim 10 and further comprising handle means on the cross-shaped channel retainer.

12. Apparatus for cutting firewood, comprising:
   a chain saw having a handle, trigger, body bar and chain;
   a bench for supporting the chain saw, including a first support panel member having an interdigital slot, a second support panel member having a cooperating interdigital slot for mating with the first support panel member to form a cross, and a top member hingedly mounted on the first support panel member proximate an upper edge parallel to its slot, the top member being further adapted to detachably engage the second support panel member proximate an upper edge parallel to its slot when the cross is formed to position the top member in a horizontal position;
   means for restraining the handle and body of the chain saw on the top member in a position which permits cutting access to a top of the bar and chain; and
   remote control means operably connected to the chain saw and having an activator pedal positioned remote from the chain saw and the top member for control of the operation of the chain saw by pressure applied to the activator pedal.

13. The apparatus of claim 12 wherein the means for restraining includes clamp means on the top member for restraining the handle and the body.

14. The apparatus of claim 12 wherein the remote control means includes a movable cable attached to the trigger, biasing means maintaining the trigger in a normal idle position, sheath means enclosing said movable cable and fixedly positioned with respect to the trigger to permit relative movement of the movable cable with respect to the trigger, and wherein the activator pedal includes means attached to the movable cable for movement thereof to activate the trigger.

15. The apparatus of claim 12 wherein the activator pedal is a foot pedal adapted to be foot activated by an operator.

16. The apparatus of claim 12 wherein the activator pedal is a knee actuated pedal mounted on the bench and adapted to be activated by an operator's knee.

17. The apparatus of claim 12 which further includes lock means for temporarily locking the top member to the second support panel member.

18. The apparatus of claim 17 wherein the lock means comprises a flange attached to the top member for engaging and holding the upper edge of the second support panel member.

* * * * *